(12) United States Patent
Karim et al.

(10) Patent No.: US 10,217,564 B2
(45) Date of Patent: Feb. 26, 2019

(54) SOLID-STATE FILM CAPACITORS USING SELF-ASSEMBLED BLOCK COPOLYMERS

(71) Applicants: Alamgir Karim, Akron, OH (US); Saumil Prashant Samant, Hillsboro, OR (US)

(72) Inventors: Alamgir Karim, Akron, OH (US); Saumil Prashant Samant, Hillsboro, OR (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 15/365,185

(22) Filed: Nov. 30, 2016

(65) Prior Publication Data

US 2017/0154730 A1  Jun. 1, 2017

Related U.S. Application Data

(60) Provisional application No. 62/260,814, filed on Nov. 30, 2015.

(51) Int. Cl.
*H01G 4/008* (2006.01)
*H01G 4/18* (2006.01)
*H01G 4/20* (2006.01)

(52) U.S. Cl.
CPC ............... *H01G 4/008* (2013.01); *H01G 4/18* (2013.01); *H01G 4/20* (2013.01)

(58) Field of Classification Search
CPC ............ H01G 4/14; H01G 4/008; H01G 4/30; H01G 4/012; H01G 4/12; H01G 4/06
See application file for complete search history.

(56) References Cited

U.S. PATENT DOCUMENTS

| | | | |
|---|---|---|---|
| 9,045,579 B2 * | 6/2015 | Xia | C08G 81/00 |
| 9,453,943 B2 * | 9/2016 | Miyake | G02B 1/005 |
| 2008/0299353 A1 * | 12/2008 | Stoykovich | B81C 1/00031 428/195.1 |
| 2009/0111944 A1 * | 4/2009 | Kuhlman | C08F 10/00 525/195 |
| 2010/0055390 A1 * | 3/2010 | Ishizuka | B32B 15/08 428/119 |
| 2010/0330674 A1 * | 12/2010 | Rubinsztajn | C12N 5/0068 435/396 |
| 2014/0128687 A1 * | 5/2014 | White | A61B 5/6801 600/300 |

* cited by examiner

*Primary Examiner* — Nguyen T Ha
(74) *Attorney, Agent, or Firm* — Renner Kenner Greive Bobak Taylor & Weber

(57) ABSTRACT

A capacitor including: a first electrode; a second electrode; and a dielectric material situated between the first electrode and the second electrode, where the dielectric material is a self-assembled block-copolymer film with a periodic morphology. The self-assembled block-copolymer film may have a lamellar morphology that is horizontally oriented into layers of copolymer parallel to the first electrode and second electrode.

22 Claims, 10 Drawing Sheets

SOLID-STATE FILM CAPACITORS USING SELF-ASSEMBLED BLOCK COPOLYMERS

CROSS-REFERENCE TO RELATED APPLICATIONS

This application claims the benefits of U.S. Provisional Patent Application No. 62/260,814 filed Nov. 30, 2015 which is incorporated herein by reference.

STATEMENT REGARDING FEDERALLY SPONSORED RESEARCH OR DEVELOPMENT

This invention was made with government support under contract number FA9550-12-1-0306 awarded by Air Force Office of Scientific Research and contract number DMR-1006421 awarded by National Science Foundation. The government has certain rights in the invention.

FIELD OF THE INVENTION

Embodiments are directed to solid-state film capacitors with an ordered block copolymer dielectric material.

BACKGROUND OF THE INVENTION

Electrostatic or solid-state capacitors are energy storage devices ubiquitous in all major electrical and electronic devices and are an integrated component of Printed Circuit Boards (PCB), pulsed lasers, radars and sensors. These capacitors operate at a high voltage and have fast charge-discharge characteristics on the order of ms-μs unlike batteries and supercapacitors, which make them especially suitable for pulsed-power applications requiring high power densities.

Solid-state capacitors consist of a solid dielectric material between two electrodes, with the maximum energy storage density dependent on the dielectric properties of the material, namely relative permittivity ($\varepsilon_r$), breakdown strength ($E_{BD}$) and dielectric loss (tan δ). Polymer films are widely employed as the dielectric material in these capacitors as they possess the advantages of being lightweight, easy to process and cheaper as compared to alternative ceramic dielectrics. Polymers also have inherently higher voltage endurance and lower dielectric losses. Although polymer film capacitors possess high power densities, they fall short in terms of energy storage density as compared to batteries, fuel cells or supercapacitors. There is a critical need to improve the current energy densities of polymer film capacitors to replace the bulky batteries and fuel cells for next-generation lightweight and flexible electronic systems.

A capacitor is charged by applying an electric field that is stored as energy within the dielectric material. One of the primary limiting factors for energy storage of a capacitor is voltage endurance i.e. breakdown strength ($EB_D$) of the dielectric material at high electric fields or voltages. A primary mechanism of breakdown in polymer dielectrics is the formation of conducting fractal channels called electrical trees, which grow across the dielectric from a point of failure towards the electrode. If the propagation of applied electrical field through the electrical trees is impeded, it can significantly improve the breakdown strength of the dielectric and consequently the energy storage. This can be achieved through the use of new polymeric materials, architectures and processing strategies that enhance the dielectric material properties.

SUMMARY OF THE INVENTION

A first embodiment provides a capacitor comprising: a first electrode; a second electrode; and a dielectric material situated between the first electrode and the second electrode, where the dielectric material comprises a self-assembled block-copolymer film with a periodic morphology.

A second embodiment provides a capacitor as in the first embodiment, where the periodic morphology of the self-assembled block-copolymer film is lamellar, cylindrical, spherical, bicontinuous double gyroid, bicontinuous cubic or hexagonally perforated lamellar.

A third embodiment provides a capacitor as in either the first embodiment or the second embodiment, where the self-assembled block-copolymer film has a lamellar morphology that is horizontally oriented into layers of copolymer parallel to the first electrode and second electrode.

A fourth embodiment provides a capacitor as in any of the first through third embodiments, where layers of the self-assembled block-copolymer film are from about 5 nm to about 150 nm.

A fifth embodiment provides a capacitor as in any of the first through fourth embodiments, where the self-assembled block-copolymer film has at least 8 layers of copolymer.

A sixth embodiment provides a capacitor as in any of the first through fifth embodiments, where the self-assembled block-copolymer film includes a second polymer miscible with one of the polymer blocks of the block copolymer of the self-assembled block-copolymer film.

A seventh embodiment provides a capacitor as in any of the first through sixth embodiments, where the second polymer miscible with one of the polymer blocks is a homopolymer.

An eighth embodiment provides a capacitor as in any of the first through seventh embodiments, where the one of the blocks of the block-copolymer of the self-assembled block-copolymer film has a different relative permittivity.

A ninth embodiment provides a capacitor as in any of the first through eighth embodiments, where the self-assembled block-copolymer film includes a filler.

A tenth embodiment provides a capacitor as in any of the first through ninth embodiments, where the filler is dispersed in non-contiguous layers of the self-assembled block-copolymer film.

An eleventh embodiment provides a capacitor as in any of the first through tenth embodiments, where the filler is an inorganic filler.

A twelfth embodiment provides a capacitor as in any of the first through eleventh embodiments, where the filler is an organic filler.

A thirteenth embodiment provides a capacitor as in any of the first through twelfth embodiments, where at least one of the polymer blocks of the block copolymer of the self-assembled block-copolymer film is an amorphous polymer.

A fourteenth embodiment provides a capacitor as in any of the first through thirteenth embodiments, where at least one of the polymer blocks of the block copolymer of the self-assembled block-copolymer film is a semi-crystalline polymer.

A fifteenth embodiment provides a capacitor as in any of the first through fourteenth embodiments, where at least one of the polymer blocks of the block copolymer of the self-assembled block-copolymer film is an elastomer.

A sixteenth embodiment provides a capacitor as in any of the first through fifteenth embodiments, where at least one of the polymer blocks of the block copolymer of the self-assembled block-copolymer film is an inorganic polymer.

A seventeenth embodiment provides a capacitor as in any of the first through sixteenth embodiments, where self-assembled block-copolymer film has a higher breakdown strength than that of the same block copolymer that is not ordered An eighteenth embodiment provides a capacitor as in any of the first through seventeenth embodiments, where the first electrode, second electrode, or both the first electrode and second electrode are made of a metal selected from Ni, Al, Pt, Pd, Ta, Au, Ag, or Cu.

A nineteenth embodiment provides a circuit comprising the capacitor that includes a self-assembled block-copolymer film an of the first through eighteenth embodiments.

A twentieth embodiment provides method for preparing a capacitor comprising: ordering a block copolymer film in a cold zone annealing soft shear apparatus to produce a self-assembled block-copolymer film has a lamellar morphology that is horizontally oriented into layers of copolymer; and adding an electrode so that the electrode is parallel to the layers of copolymer.

A twenty-first embodiment provides a method as in the twentieth embodiment, where step of ordering a block copolymer in a cold zone annealing soft shear apparatus comprises contacting the block copolymer film with a confining layer, wherein one of the block copolymer film and the confining layer has a coefficient of thermal expansion that is at least twice the coefficient of thermal expansion of the other; moving the block copolymer film and the annealing zone relative to each other, such that the block copolymer film is positioned in between the heating element and the confining layer; and moving the block copolymer film and the annealing zone relative to each other to anneal the block copolymer film with the annealing zone.

A twenty-second embodiment provides a method as either the twentieth or twenty-first embodiment, where the step adding an electrode so that the electrode is parallel to the layers of copolymer is performed by sputter coating an electrode onto the block copolymer film.

A twenty-third embodiment provides a method as in any of the twentieth through twenty-second embodiments, where block copolymer film is supported by an electrode.

DETAILED DESCRIPTION OF ILLUSTRATIVE EMBODIMENTS

Embodiments are based, at least in part, on the discovery that self-assembled block-copolymer films with a periodic morphology may be used as a dielectric material in a capacitor. The self-assembled block-copolymer films with a periodic morphology, which may simply be referred to as ordered block copolymers, are block copolymers where the individual blocks phase separate into ordered periodic structures that have interfaces where the individual phase separated blocks of the polymer meet. Advantageously, it has been found that the interfaces may act as barriers to electric field propagation and increase the breakdown strength of the dielectric. The increased breakdown strength of ordered block copolymer dielectrics may be used to produce capacitors with an advantageously high energy storage density. In these or other embodiment, the energy storage density may be higher than that of the same block copolymer that is not ordered. The process for preparing the ordered block copolymers is has reduced steps and potential cost saving benefits over multilayer co-extrusion techniques.

Figure 1:
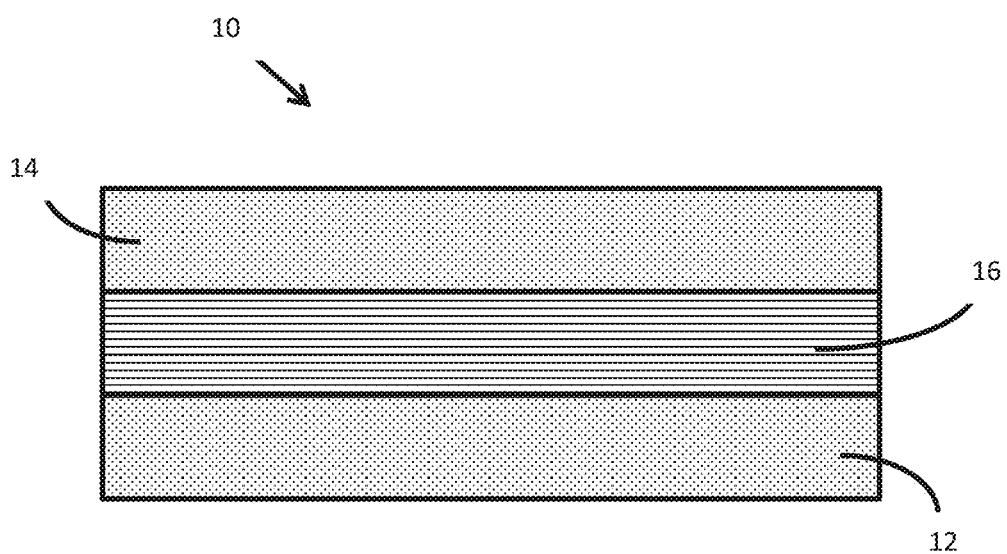
FIG. 1 provides a schematic perspective view of a capacitor of one or more embodiments.
Figure 2:
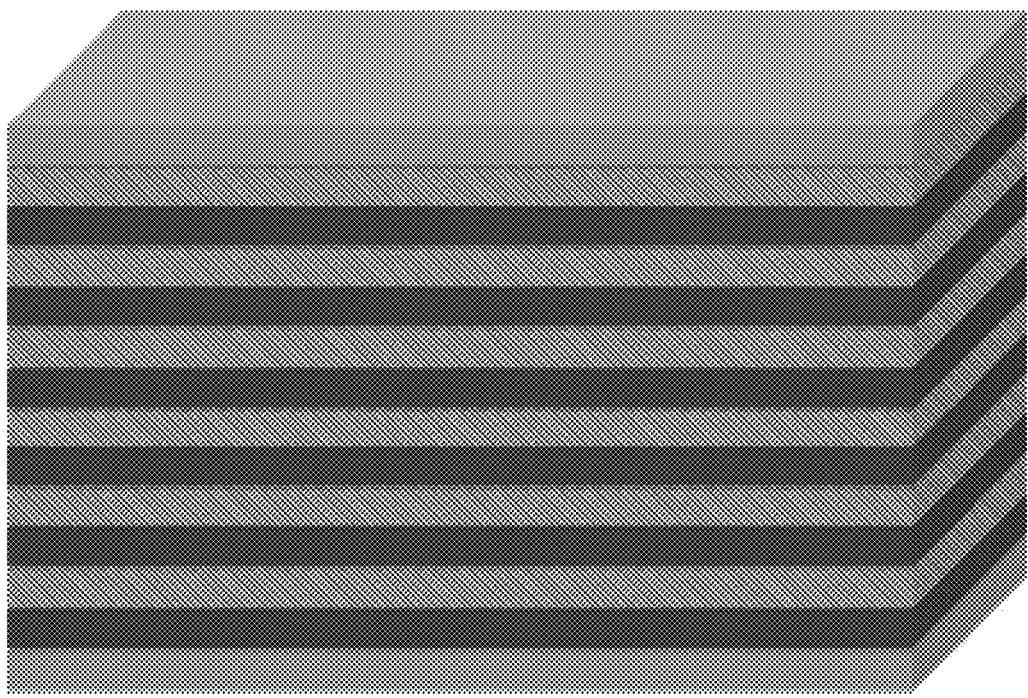
FIG. 2 is a schematic illustration of a capacitor consisting of two metal electrodes and a multilayered self-assembled lamellar block copolymer film as the dielectric material.
Figure 3:
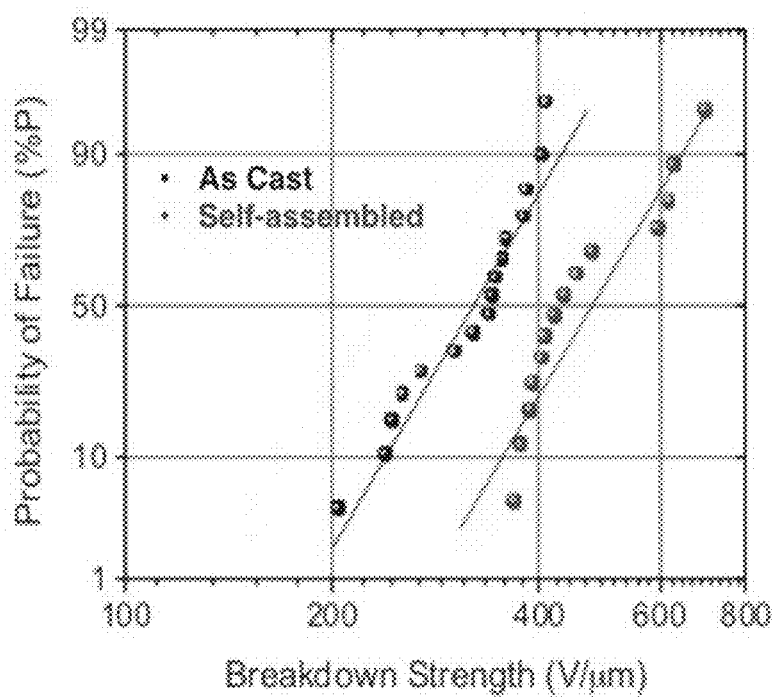
FIG. 3 shows a plot of Weibull probability distribution function of breakdown strength of PS-b-PMMA diblock copolymer films.

With reference to FIG. 1, a capacitor 10 may comprise a first electrode 12, with a dielectric material 16 disposed on the first electrode 12. A second electrode 14 is disposed on the dielectric material 16. The capacitor may be part of an electronic circuit (not shown), by connecting the first electrode 12 and the second electrode 14 to a voltage source. While FIG. 1 shows the capacitor with planar electrodes and dielectric material, as those skilled in the art will appreciate, that the electrodes and dielectric material of the capacitor may be rolled. In other embodiments, the capacitor may have an interior electrode surrounded by the dielectric material, and a second electrode surrounding the dielectric material. As indicated above, the dielectric material 16 may be an ordered block-copolymer film.

The electrodes may be either a rigid or flexible conductive material. Suitable materials for preparing an electrode include, but are not limited to, graphene, Ni, Al, Pt, Pd, Ta, Au, Ag, and Cu. In one nor more embodiments, one or both of the electrodes may be applied after the block copolymers are self-assembled block-copolymer to have a periodic morphology. In certain embodiments, an electrode may be applied to one or both sides of the ordered block copolymer film. In other embodiments, electrode may be sputter-coated to one or both sides of the ordered block copolymer film. In one nor more embodiments, one of the electrodes may be applied before the block copolymers are self-assembled block-copolymer to have a periodic morphology. In these or other embodiments, a the block copolymer film may be coated onto a first electrode before block copolymers are self-assembled block-copolymer to have a periodic morphology. The second electrode may then be applied to the ordered block copolymer or sputter coated onto the ordered block copolymer.

Block copolymers suitable for use in a ordered block copolymer film include any block copolymer that will self-assemble to exhibit a periodic structure when annealed. These will be readily appreciated or easily determined by those of ordinary skill in the art. In one or more embodiments, the block copolymers include those polymers that include two or more blocks of different mer units.

In one or embodiments, the block copolymer may be a di-block copolymer represented by the formula: A-B, where A represents a block of repeating units and B represents a second different block of repeating units. In one or embodiments, the block copolymer may be a tri-block copolymer represented by the formula: A-B-A or A-B-C, where A represents a block of repeating units, B represents a second different block of repeating units, and C represents a third different block of repeating units. In one or embodiments, the block copolymer may be a tetra-block copolymer represented by the formula: A-B-A-B, A-B-C-A, A-B-C-B, or A-B-C-D, where A represents a block of repeating units, B represents a second different block of repeating units, and C represents a third different block of repeating units, and D represents a fourth different block of repeating units.

In one or more embodiments, when the block copolymer is a diblock copolymer, the diblock copolymer may be characterized by the volume ratio of the blocks within the block copolymer, which may be measured by nuclear magnetic resonance spectroscopy. As previously discussed a diblock copolymer may be represented by the formula A-B. In one or more embodiments, the volume ratio of A to B may be from about 50 to 50 to about 90 to 10, in other embodiments from about 60 to 40 to about 80 to 20, and in other embodiments from about 70 to 30 to about 75 to 25. In certain embodiments, the volume ratio of A to B may be from about 40 to 60 to about 60 to 40, and in other embodiments, from about 45 to 55 to about 55 to 45.

The polymers comprising the blocks of the block copolymer may be chosen from a group of amorphous, glassy, semicrystalline, elastomeric, or inorganic polymers For example, polymers having a polar group such as poly (methyl methacrylate) and poly (vinyl alcohol) usually have high breakdown strengths while polymers containing dipoles such as poly (vinylidene fluoride) have high permittivity. These polymers can be used in combination to optimize the dielectric performance of the films. Specific examples of polymers that can be used to form the first block and/or second block may include but not limited to poly (alkyl methacrylates), poly (ethylene oxide), poly (vinyl pyridines), poly (lactides), poly (isoprene), poly (acrylics acids), poly (alkylene oxides), polyamides, poly (vinyl alcohols), polystyrene, polybutadiene, poly (alkyl siloxanes), polyolefins, polycarbonates, poly (acrylonitriles), poly (vinylidene fluorides), polytetrafluoroethylene, polypentafluorostyrene and the like. In one or more embodiments, the above-mentioned polymers may be used individually (i.e. as homopolymers) for use a miscible polymer as described in further detail below.

In one or more embodiments, the block copolymer may include two or more polymer blocks with a different relative permittivity. In one or more embodiments, where the block copolymer is a diblock copolymer, the ratio of the relative permittivity between the block with a lower permittivity between and higher permittivity between is from about 1:1.01 to about 1:1.10, in other embodiments from about 1:1.1 to about 1:6, in other embodiments from about 1:1.2 to about 1:3, in other embodiments from about 1:1.3 to about 1:3, and in other embodiments from about 1:1.5 to about 1:2. In these or other embodiments, the block copolymer may include two or more polymer blocks with different breakdown strengths.

The annealing process is not sensitive to the method of formation of the block copolymer film. Exemplary methods of forming block copolymer films include, but are not limited to, spin coating, and flow coating. In one or more embodiments, any solvents used in the process of forming a block copolymer film are removed before the annealing the block copolymer film. As noted above, in certain embodiments, the block copolymer film may be formed directly on one of the electrodes.

As noted above, ordered block copolymers are block copolymers that have undergone phase separation to exhibit a periodic structure. Phase separation may be through a self-assembly process where similar blocks segregate from dissimilar blocks resulting in a periodic structure. The self-assembly of block copolymers into periodic structures may be directed by solvent evaporation, thermal annealing, solvent annealing, electric field alignment, magnetic field alignment, shear alignment, topographical patterning, and substrate modification. Periodic structures may include, but are not limited to, lamellar, cylindrical, spherical, bicontinuous double gyroid, bicontinuous cubic or hexagonally perforated lamellar nanostructure. Phase separation may produce periodic structure in the nanoscale, which may be referred to as nanostructures. Nanostructures may be produced with a periodicity in the range of about 5 nm to about 150 nm. Periodicity may be measured by x-ray scattering, neutron scattering, TEM, AFM, or SEM. In one or more embodiments, oriented block copolymers may exhibit a hierarchical structure, where the periodic structure has a macroscopic pattern and nanoscopic block copolymer pattern.

In certain embodiments, in addition to annealing the block copolymer film may be axially stretched in at least one direction. In these or other embodiments, the block copolymer may be axially stretched in at least one direction substantially parallel to the top and bottom surface of the film, at a stretching ratio sufficient to improve the breakdown strength of the diblock copolymer film.

In one or more embodiment, the ordered block-copolymer film of the capacitor may be directionally oriented block copolymer. Directionally oriented block copolymers are block copolymers wherein a substantial portion of the periodic structure of the block copolymer is aligned in the same direction. Alignment of the periodic structure of the block copolymer may be described in reference to the first electrode and second electrode. When the block copolymers are directionally oriented in a plane parallel (or substantially parallel) to the planes of the first electrode and second electrode, the directionally oriented block copolymer may be referred to as being horizontally oriented. When the block copolymers are directionally oriented in a plane that is perpendicular (or substantially perpendicular) to the to the planes of the first electrode and second electrode, the directionally oriented block copolymer may be referred to as being vertically oriented.

It has advantageously been found that a self-assembled block-copolymer film that has a lamellar morphology horizontally oriented into layers of copolymer parallel to the first electrode and second electrode may be used in a capacitor. While not wishing to be bound by any particular mode of operation or theory, it is believed that interfaces between the horizontal layers of the block copolymer act as barriers to electric field propagation and increase the breakdown strength of the dielectric. Advantageously, an ordered block-copolymer film that has a lamellar morphology that is horizontally oriented has a breakdown strength that is higher than that of the same block copolymer that is not ordered. Exemplary methods of preparing a horizontally oriented copolymers with a lamellar morphology are described in U.S. Pat. Pub. 2018/0298405, which is incorporated herein by reference.

Figure 4:
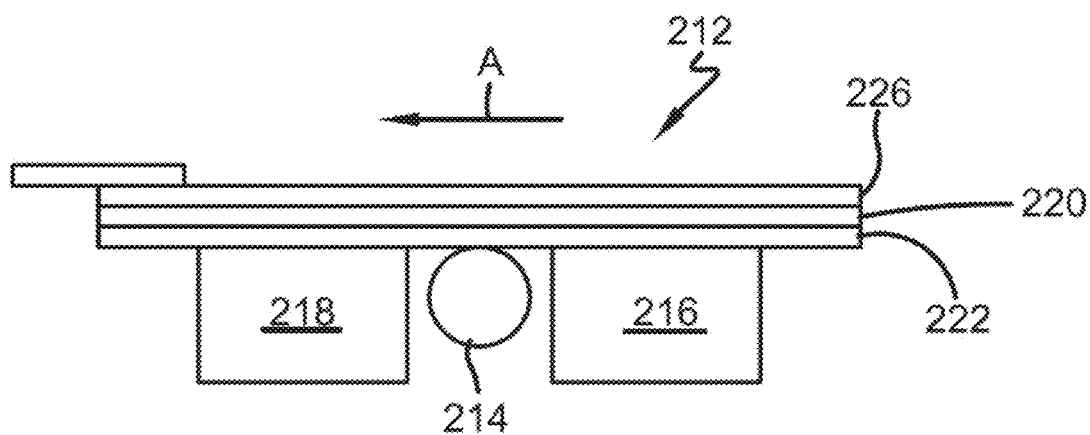
FIG. 4 provides a schematic perspective of a cold zone annealing soft shear (CZA-SS) apparatus.

In one or more embodiments, horizontally oriented copolymers with a lamellar morphology may be prepared by a Zone Annealing Soft Shear process (ZA-SS). A representative example of a ZA-SS process is disclosed with reference to FIG. 4. In FIG. 4 a block copolymer film 220 supported on a substrate 222 is passed through an annealing zone 212 including a heating element 214 positioned in between a first cooling element 216 and a second cooling element 218. The substrate 222 and block copolymer film 220 are typically moved through the annealing zone 214, but it is sufficient that the block copolymer film and the annealing zone move relative to each other, again as described above. Any means to move the block copolymer through the annealing zone can be used. In light of the direction of travel, arrow A, the first cooling element 216 may be considered an upstream block and the second cooling element 218 may be considered a downstream block relative to the position of the heating element 214. Though the substrate-supported block copolymer is moved in this example, it will be appreciated that it is sufficient that the substrate-supported BCP and the elements of the annealing zone 212 move relative to each other. As the block copolymer film 220 passes through the annealing zone 212 it is annealed by the heating element 214. The temperature changes in the heating zone cause shear between the confining layer 226 and the block copolymer film 220, and this soft shear produces horizontally oriented cylindrical domains in the BCP film.

While the annealing zone described in FIG. 4 includes one heating element positioned in between a first cooling element and a second cooling element it is sufficient that the an annealing zone includes two or more points of different temperatures, with at least a cooling element upstream of a heating element, i.e., at least on cooling element and at least one heating element. Without regard for the temperature of the surrounding atmosphere, the warmer of any two points of different temperature may be referred to as a heating point (or hot point) and the cooler of the two points may be referred to as a cooling point (or cold point). In one or more embodiments, where an annealing zone includes only two points of different temperatures it is preferred that the cooling point precedes the heating point in relation to the travel of the block copolymer film. In other words, it is preferred that a point on the block copolymer film approaches first the cooling point before the heating point.

In one or more embodiments, multiple annealing zones may be provided in series. Although the simplest annealing zone includes an upstream cold block and a heating element, and a preferred annealing zone includes an upstream cold block followed by a heating element and then a downstream cold block, in other embodiments, multiple annealing zones are provided by alternating between cold blocks and heating elements in any desired number. For example multiple annealing zones may be provided in the following order—cold point/hot point/cold point/hot point/cold point etc.

The heating element or elements may be provided by any structure capable of delivering the desired temperature to the block copolymer. In some embodiments, the heating element is selected from rods, wires, coils, lasers, infrared (IR) lamps, inductive heating elements, and microwave heating elements. Though the heating element is shown as traversing the entire width of the film, it is noted that the heating element may be shaped or directed at the film so as to only cover discrete sections thereof, and can even be focused on a point. A laser would work well for point-based application of heat. In some embodiments, the heating element(s) are in the form of resistive elements providing Joule heating (or ohmic heating/resistive heating).

The cooling element or elements may be provided by any structure capable of delivering the desired temperature and thus effecting a desired temperature differential as compared to the heating element. In some embodiments, the cooling element(s) are selected from conductive elements with cooling air or liquid flowing therethrough. In some embodiments, the conductive elements are in a form selected from blocks or rollers. In other embodiments, the cooling element(s) is merely cold liquid or air or other gas flowing over the film at the appropriate location (upstream and (if applicable) downstream of the heating element).

While embodiments described with reference to FIGS. 4, 5, and 6 include moving block copolymer film through a stationary annealing zone to directionally orient the block copolymer, embodiments may include directionally orienting a block copolymer film by providing a moving annealing zone and a stationary block copolymer film. Because one or both of the film and the block copolymer and the annealing zone may be in motion during an annealing process the motion may be described as moving the block copolymer and the annealing zone relative to each other to directionally orient the block copolymer film.

In one or more embodiments, a stationary block copolymer film may be provided and the annealing zone may move to directionally orient the block copolymer. In certain embodiments, the annealing zone may be on a track that moves along a block copolymer film to directionally orient the block copolymer. In these or other embodiments, the annealing zone may move on an x,y axis. In embodiments where the annealing zone moves on an x,y axis the path of the annealing zone may be controlled or programmed to provide a pattern of directionally oriented block copolymers.

In other embodiments, a stationary annealing zone may be provided and the block copolymer film may move to directionally orient the block copolymer. In certain embodiments, the block copolymer film is pushed or pulled through an annealing zone. In these or other embodiments, the block copolymer film may be of a length that allows for movement through the annealing zone as part of continuous process. In one or more embodiments, a continuous processes may include a roll to roll process, where a roll of block copolymer film is provided, the block copolymer film is unrolled and moved through an annealing zone to directionally orient the block copolymers, and rerolled on the other end of the annealing zone. In some embodiments, a continuous process may be provided where the block copolymer film is prepared, for example by spin coating on one end of an annealing zone, moved through an annealing zone to directionally orient the block copolymers, and rolled on the other end of the annealing zone.

Although linear movements are shown and described herein, it will also be appreciated that relative movement of the annealing zone and BCP film can be achieve in rotational movement. For example, the block copolymer could be in the form of a disc, with relative rotational movement of the annealing zone and disc.

In one or more embodiments, the annealing zone in zone annealing process supplies a max temperature above the Tg of at least one block within the block copolymer. The max temperature may be considered above the Tg of at least one block within the block copolymer when it is above the Tg of a homopolymer prepared from the polymer unit of a block within the block copolymer. In one or more embodiments, the annealing zone in cold zone annealing process supplies a max temperature above the Tg of the block copolymer. In one or more embodiments, the annealing zone in cold zone annealing process supplies a max temperature above the Tg of every block within the block copolymer. In some embodiments, solvents may be present in the block copolymer film to decrease the Tg thereof.

The annealing zone also supplies a maximum temperature lower or equal to the order-disorder transition temperature (Tour) of the block copolymer. The order-disorder transition temperature of a block copolymer is defined by the temperature at which the periodic structure in a block copolymer disappears completely—as the temperature is raised—or by the threshold temperature at which the periodic structure begins to appear—when the temperature of a block copolymer in the homogeneous state is lowered. The order-disorder transition temperature may be determined by x-ray scattering, neutron scattering, rheology based methods measuring storage modulus or loss modulus.

It should be noted that, although a substrate is shown in the Zone Annealing Soft Shear process above and in the embodiments described herein, the present invention can be practiced without a substrate if the block copolymer film is self-supporting.

Suitable substrates for supporting the BCP film include those capable of supporting the desired block copolymer film and capable of withstanding the temperatures experienced during the Zone Annealing Soft Shear processes herein. In specific processes herein, the substrate is chosen for specific reasons and will be disclosed at the appropriate location below. Exemplary substrates include quartz, mica, polydimethylsiloxane (PDMS), polyethylene terephthalate (PET), polyimides (KAPTON), glass, silicon and metals. The BCP may be deposited for support on the substrate in any known manner. Suitable methods include, but are not limited to, spin casting, blade coating, doctor blading, spray coating, electrospinning, and drop casting.

As noted above, horizontally oriented block copolymer may be prepared by a zone annealing soft shear process that comprised supplying a block copolymer film and an annealing zone, the annealing zone having a heating element; contacting the block copolymer film with a confining layer, wherein one of the block copolymer film and the confining layer has a coefficient of thermal expansion that is at least twice the coefficient of thermal expansion of the other (i.e., the block copolymer film has a coefficient of thermal expansion that is at least twice the coefficient of thermal expansion of the confining layer, or vice versa); moving the block copolymer film and the annealing zone relative to each other, such that the block copolymer film is positioned in between the heating element and the confining layer; and annealing the block copolymer film with the heating element. In some embodiments, the film is annealed by subjecting the block copolymer film to a maximum temperature of as high as 100° C. above the $T_{ODT}$ of the BCP.

The confining layer is chosen as noted above such that the coefficient of thermal expansion of either of the block copolymer film and the confining layer has a coefficient of thermal expansion that is at least 1.5 times the coefficient of thermal expansion of the other. In some embodiments, one has a coefficient of thermal expansion that is at least 2 times the coefficient of thermal expansion of the other, in other embodiments, at least 5 times and, in other embodiments, at least 10 times the coefficient of thermal expansion of the other.

In some embodiments, the confining layer has a coefficient of thermal expansion that is at least twice that of the BCP film. In other embodiments, the confining layer has a coefficient of thermal expansion that is at least 1.5 times that of the BCP film, in other embodiments, at least 2 times, in other embodiments, at least 5 times, and, in other embodiments, at least 10 times that of the BCP film.

The confining layer is positioned so that at least a portion of the cross section of the BCP film that is being heated by the heating element is positioned between the heating element and the confining layer. The confining layer contacts the BCP film confromally with at least the pressure of gravity.

The difference in coefficient of thermal expansion causes different levels of directional expansion and contraction of the BCP film and confining layer in the annealing direction, expanding in the heating zone(s) and contracting in the cooling zone(s), thus setting up a single cycle of oscillatory shear. The shear facilitates unidirectional alignment of BCP films over a wide range of thicknesses and processing speeds.

In one or more embodiments, confining layers suitable for use in the production of directionally oriented block copolymers in this method have a thickness of less than or equal to 10 µm. In other embodiments, confining layers suitable for use in this method have a thickness of less than or equal to 5 µm, in other embodiments, 3 µm, in other embodiments, less than or equal to 1 µm, in other embodiments, less than or equal to 500 nm, in other embodiments, less than or equal to 250 nm, in other embodiments, less than or equal to 100 nm. There is no limit on how thin the film can be, as the temperature will easily affect very thin films.

The confining layer may be selected from silicones, polyurethanes, liquid crystal elastomers and elastomers. Silicone confining layers may be selected from polydimethylsiloxane.

Figure 5:
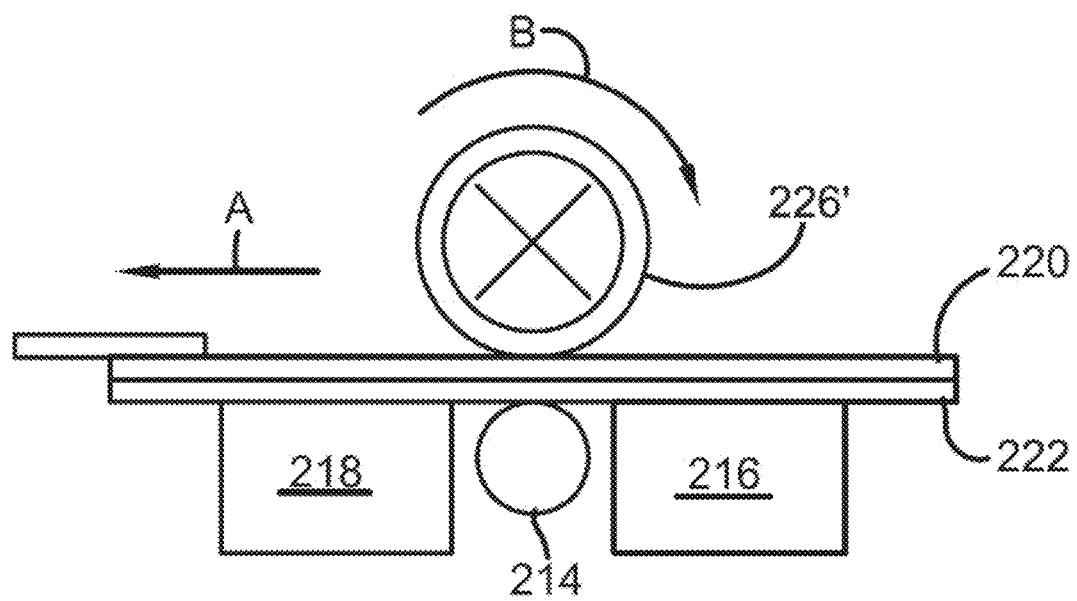
FIG. 5 provides a schematic perspective of an alternate CZA-SS apparatus and method.

In an adaptation of this apparatus and method shown in FIG. 5, the confining layer 226' wraps the face of a roller 228, whereby the confining layer 226' is able to provide continuous contact with the block copolymer film 220 over at least a portion of the heating element 214.

Figure 6:
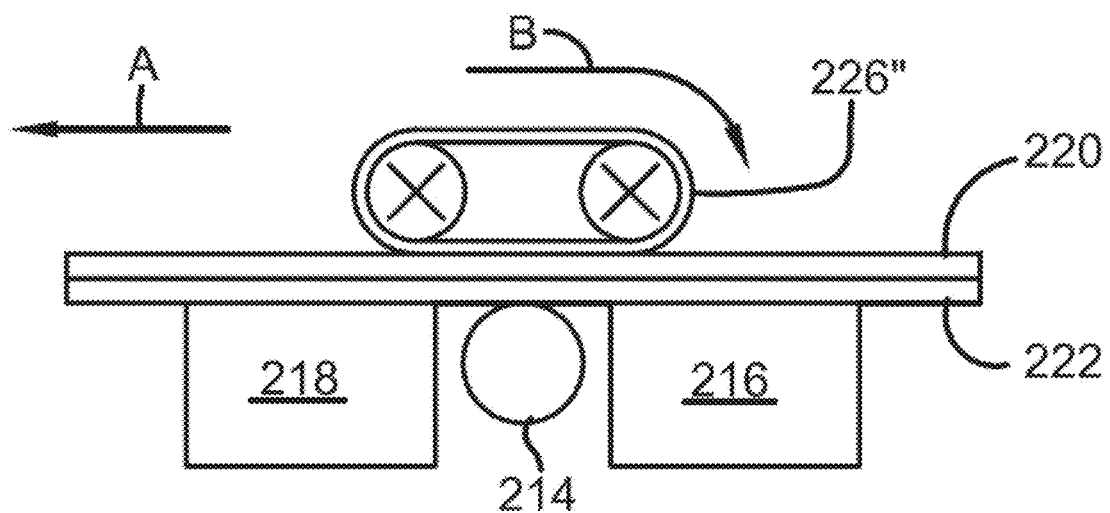
FIG. 6 provides a schematic perspective of another alternate CZA-SS apparatus and method.

In another adaptation of this apparatus and method shown in FIG. 6, the confining layer 226" is in the form of a conveyor belt 230, whereby the confining layer 226" is able to provide continuous contact with the block copolymer film 220 over a more substantial surface area. This surface area may include the surface area over at least a portion of the heating element 214, and, in some embodiments at least a portion of one or more cooling elements 216, 218.

In both the roller 228 and conveyor belt 230 embodiments, the roller or conveyor belt can be freewheeling or can provide slight resistance to the movement of the BCP film 220 and substrate 222. The resistance should range between 0 to 200% of the thermally induced shear by the elastomer. The process is a dual shear method—the shear is due to the resistance and the induced shear due to thermal expansion of elastomer due to the temperature gradient. The BCP film 220 and substrate 222 are pulled in the direction of arrow A, and the roller 228 rotates in the direction of arrow B, while the conveyor belt advances in the direction of arrow C.

Horizontal alignment of the block copolymers may be expressed in terms of Herman's orientation function. Block polymers that are perfectly aligned in the desired direction have a Herman's orientation function value of 1, random alignment receives a value of 0, and alignment perpendicular to the desired alignment receives a value of −0.5. In one or more embodiments, substantial alignment of the block copolymer may refer those directionally oriented block copolymers with a Herman's orientation function value greater than 0.6, in other embodiments greater than 0.7, in other embodiments greater than 0.8, in other embodiments greater than 0.9, and in still other embodiments of about 1.

In one or more embodiments, substantial alignment of the block copolymer may refer those directionally oriented block copolymers with a percent of vertically aligned domains greater than 60%, in other embodiments greater than 70%, in other embodiments greater than 80%, in other embodiments greater than 90%, and in still other embodiments about 100%. The directionally oriented block copolymers are also characterized by having good long-range order, which is inversely related to grain boundaries (thus also characterized by low number of grain boundaries.

Horizontal alignment can also be characterized by the degree of angular spread. Typically, oriented nanostructures have an angular spread as high as 50 degrees to as low as 1 degree.

The BCP may also include inclusions that are compatible or incompatible with the BCP. For example, the BCP may include micro- and nano-particles, surfactants, homopolymers and solvents and virtually any inclusion that does not compromise the self-assembly (directional orienting) of the BCP.

In one or more embodiments, a filler may be included in the block copolymer film. Fillers may be incorporated into the ordered block copolymer film by external addition or internal chain modification. In one or more embodiments, a filler may be added with an advantageous or high permittivity to improve the dielectric performance of the ordered block copolymer film. In one or more embodiments, the filler may be added to non-contiguous layers of the self-assembled block-copolymer film. For example, when the block copolymer is an A-B copolymer, a filler may be added to only the layers of the ordered block copolymer film that comprise the A blocks. Advantageously, a filler in non-contiguous layers cannot make contact with additional fillers in other layers, Contact of fillers across layers may lead to a decrease in dielectric performance.

Suitable include organic and inorganic fillers. Inorganic fillers include, for example, nanoparticle of barium titanate, titanium dioxide. Organic fillers include, for example homopolymers, functionalized or non-functionalized graphine oxide, functionalized or non-functionalized carbon nanotubes, or combinations thereof.

In one or more embodiments, the self-assembled block-copolymer film may include a polymer miscible with one of the polymer blocks of the block copolymer of the self-assembled block-copolymer film. Suitable miscible polymers should be miscible with a block of the copolymer and immiscible with another block, so the miscible separates into a single layer. In these or other embodiments, the miscible polymer may be used to increase the height of a layer of the ordered block copolymer film. Suitable miscible polymers, random copolymers and homopolymers. In one or more embodiments, the miscible may be a homopolymer comprising the same monomeric units as one of the blocks of the block copolymer.

In one or more embodiments, suitable ordered block films have a thickness of less than 10 μm, in other embodiments less than 5 μm, in other embodiments less than 3 μm, in other embodiments less than 1 μm, and in other embodiments less than 500 nm. In these or other embodiments, films suitable for use in the production of ordered block copolymers have a thickness of greater than 5 nm, in other embodiments greater than 10 nm, in other embodiments greater than 30 nm, in other embodiments greater than 50 nm, and in other embodiments greater than 100 nm. In one or more embodiments, films suitable for use in the production of ordered block copolymers have a thickness of about 5 nm to about 10 μm, in other embodiments about 10 nm to about 5 μm, in other embodiments about 30 μm to about 3 μm, in other embodiments about 50 nm to about 1 μm, and in other embodiments about 100 nm to about 500 nm.

As indicated above, an ordered block-copolymer film that has a lamellar morphology that is horizontally oriented includes layers of the individual blocks of the copolymers. In one or more embodiments, the capacitor may have at least 2 layers of copolymer, in other embodiments at least 6 layers, in other embodiments at least 8 layers, in other embodiments at least 20 layers, in other embodiments at least 35 layers, and in other embodiments at least 60 layers In these or other embodiments, the capacitor may have at most 1000 layers of copolymer, in other embodiments at most 500 layers, in other embodiments at most 250 layers, in other embodiments at most 125 layers, and in other embodiments at most 100 layers. In one or more embodiments, the capacitor may have from about 2 layers to about 1000 layers of copolymer, in other embodiments from about 6 layers to about 500 layers, from about 8 layers to about 250 layers, from about 20 layers to about 125 layers, and from about 35 layers to about 100 layers.

In one or more embodiments, the individual layers of the block copolymer film may be at least 5 nm, in other embodiments at least 10 nm, in other embodiments at least 20 nm, and in other embodiments at least 30 nm. In these or other embodiments, the individual layers of the block copolymer film may be at most 150 nm, in other embodiments at most 120 nm, in other embodiments at most 100 nm, and in other embodiments at most 80 nm. In one or more embodiments, the individual layers of the block copolymer film may be from about 5 nm to about 150 nm, in other embodiments from about 10 nm to about 120 nm, in other embodiments from about 20 nm to about 100 nm and in other embodiments from about 30 nm to about 80 nm.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Film Preparation and Processing:
Diblock copolymers PS-b-PMMA ($M_n$=66 kg mol$^{-1}$), deuterated PS-b-PMMA ($M_n$=37.6 kg mol$^{-1}$) with the PS block deuterated, PS-b-P2VP ($M_n$=50 kg mol$^{-1}$) and homopolymers PS (100 kg mol$^{-1}$) and PMMA (88 kg mol$^{-1}$) were purchased from PolymerSource Inc. and used as received. Electron beam physical vapor deposition was utilized to coat 100 nm thick aluminum films (roughness 2 nm) onto quartz wafers (GM Associates Inc.) to form the bottom electrode for breakdown testing. Polymer samples were dissolved in toluene and 10% (w/w) solutions were flow-coated (Supplementary FIG. 1) onto UV-Ozone (Novoscan Tech., Inc) cleaned Al-coated (1 inch×3 inch) quartz slides. UV-Ozone treatment removes organic impurities from the substrate surface, forms an oxide layer and thereby increases wettability of polymer film. Film thicknesses were measured using a Bruker DektakXT profilometer. Prior to processing, the films were dried in a vacuum oven at 65° C. for 12 hours to remove residual solvent. Conventional oven annealing was carried out in an oven at 205° C. under vacuum.

Electron Microscopy:

TEM samples of the film cross-sections were made via the in-situ lift-out method using a FEI Helios 600 dual-beam FIB and imaged with a JEOL 1400 LAB6 TEM at 120 keV. All images are brightfield images.

Neutron Reflectivity:

The Neutron Reflectivity (NR) experiments were carried out on the NG7 horizontal reflectometer at NIST Center for Neutron Research. A 4.76 Å collimated neutron beam with a wavelength divergence of 0.18 Å was used. Scans were made over a wave vector magnitude ($q_z$) range from 0.005 Å$^{-1}$ to 0.16 Å$^{-1}$. A pure quartz substrate was used in place of Al-coated quartz for the NR measurements for ease of data fitting. Data fitting and conversion of the NR spectra to the scattering length density (SLD) and concentration profile was done using Reflpak software (NIST CNR).

Grazing-Incidence Small-Angle X-Ray Scattering:

GISAXS experiments were performed at beamline 8-ID of the Advanced Photon Source, Argonne National Laboratory, as well as beamline X9 of the National Synchrotron Light Source, Brookhaven National Laboratory. An X-ray beam of 7.35 keV (8-ID) or 14.1 keV (X9) impinged on the films (in vacuum) at an angle well above the critical angle of the films, to probe bulk of the film. Data was collected on a Dectris Pilatus 1 M pixel-array detector. Data analysis and conversion to q-space was done using GIXSGUI software in Matlab, developed at beamline 8-ID.

Dielectric Testing:

All samples were annealed at 80° C. for 12 h prior to breakdown testing to remove residual solvent and adsorbed water that may be present within the film. Dielectric breakdown trials were performed using a 10 kV Spellman SL300 high voltage supply controlled by a ramping circuit (Supporting Information Figure S3). The ramp was set such that a breakdown event occurs at ~20 seconds, in accordance to ASTM standard protocol for short-term dielectric strength tests (which corresponds to 50-300 V/s, depending on the sample). Once>1 mA current passes through the device, a silicon rectifier switch activates and breaks the circuit. The breakdown voltages were read from a Fluke 289 multimeter set in peak capture mode. Our experimental geometry features a copper rod with a hemispherical end (radius of curvature=2.5 mm) that makes direct contact with the BCP film. Breakdown is confined to a small sample region (area~0.1 cm$^2$) in an attempt to remove the influence of film heterogeneity by spatially localizing the electric field. At least 15 breakdown trials were performed for each film to conduct Weibull failure analysis. The copper contact rod was polished after every 15 breakdowns using diamond paste to remove pitting. All experiments were conducted at room temperature in an N$_2$ purged environment where relative humidity was observed in the range of 10-20%. Breakdown voltages were converted to breakdown strength by measuring film thickness near each test site via profilometry.

Permittivity measurements were conducted using a Novocontrol Impedance Spectroscopy Analyzer and facilitated by coating the BCP films with a 3 mm diameter circular aluminum top electrode.

BCP Film Processing:

The effect of a self-assembled multilayered barrier structure on the breakdown properties was studied using the model BCP system polystyrene-b-poly (methyl methacrylate) (PS-b-PMMA), where the individual blocks have disparate dielectric breakdown values (PS~250 V/µm, PMMA~500 V/µm), but relatively close dielectric permittivity at 1 kHz [PS ($\varepsilon_r$~2.6), PMMA ($\varepsilon_r$~3.2)]. To elucidate the generality of the concept, we also studied another BCP system, polystyrene-b-poly (2-vinyl pyridine) (PS-b-P2VP), wherein the blocks have closer dielectric strength (PS~250 V/µm, P2VP~380 V/µm), but much higher dielectric contrast [P2VP ($\square_r$~5)]. Approximately 1 µm thick BCP films of lamellae-forming PS-b-PMMA (19.5-b-18.1 kg mol$^{-1}$ and 33-b-33 kg mol$^{-1}$) and PS-b-P2VP (25-b-25 kg mol$^{-1}$) were cast onto smooth aluminum-coated quartz substrates, which act as the bottom electrode, using a flowcoating technique. The films were then subjected to the CZA-SS process of directed self-assembly. Briefly, a cross-linked PDMS pad is placed over the BCP films that are linearly translated over the cold block-hot wire-cold block CZA. The temperature of the hot rod ($T_{max}$) was set to 205° C. (well above the $T_g$ of all polymers under investigation) whereas the cold blocks were kept at 26° C. giving an in-plane temperature gradient of ~45° C./mm. The films were translated with a velocity of V=5 µm/s, which corresponds to a $T_g$-to-$T_g$ annealing time of 30 minutes on the temperature gradient curve. Since, the coefficient of thermal expansion of PDMS is about 4 times that of the BCP film, a thermal gradient-induced differential expansion and contraction of PDMS over the BCP results in a single oscillatory shear cycle, generating a shear stress of about 120 kPa at the PDMS-BCP film interface. This shear stress directs the alignment of the BCP lamellae parallel to the substrate.

Figure 7A:
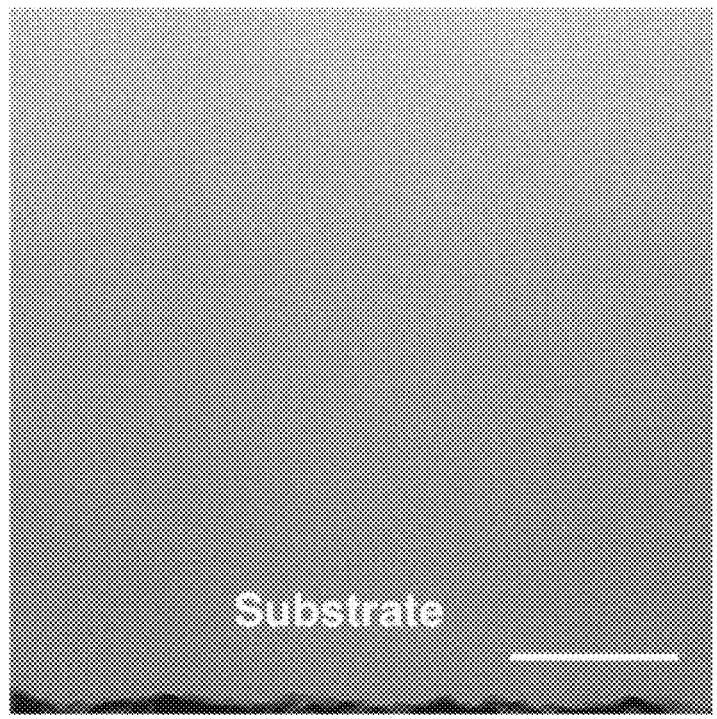
FIG. 7A provides a cross-sectional TEM images (no stain) of PS-b-PMMA (19.5-b-18.1 kg mol$^{-1}$) film on Al coated quartz substrate as-cast (Scale bar: 0.2 μm)
Figure 7B:
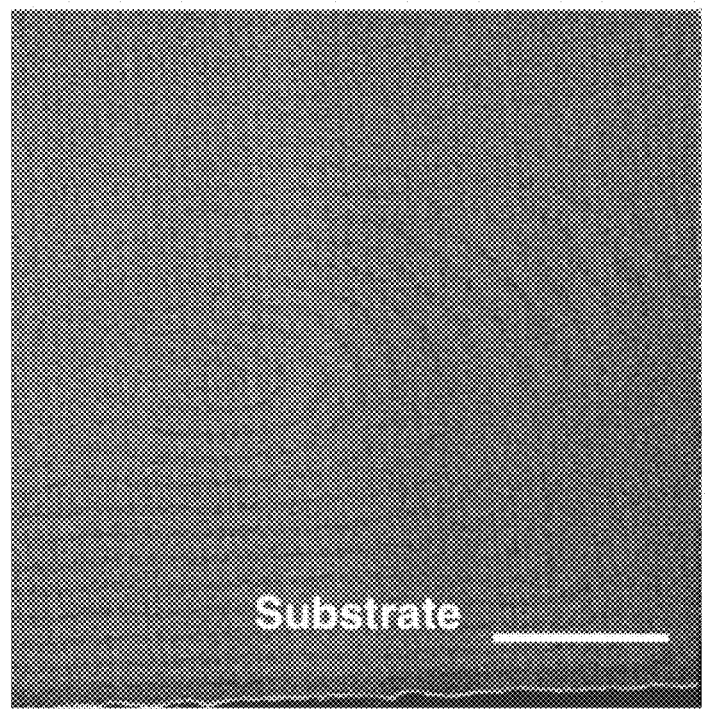
FIG. 7B provides a cross-sectional TEM images (no stain) of PS-b-PMMA (19.5-b-18.1 kg mol$^{-1}$) film on Al coated quartz substrate oven annealed for 96 hours at 205° C. under vacuum (Scale bar: 0.2 μm)
Figure 7C:
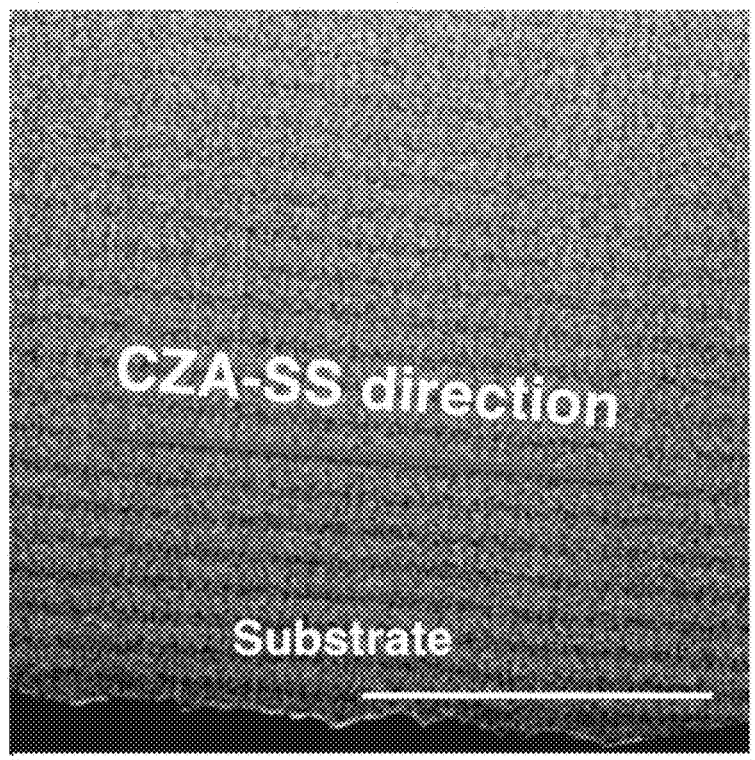
FIG. 7C provides a cross-sectional TEM images (no stain) of PS-b-PMMA (19.5-b-18.1 kg mol$^{-1}$) film on Al coated quartz substrate: CZA-SS at $T_{max}$=205° C., V=5 μm/s (Scale bar: 0.2 μm)

Morphology of BCP Films:

By processing the film using CZA-SS, we obtain a completely parallel (to the substrate) lamellar morphology within the entire ~1 µm thick PS-b-PMMA film as shown in the cross-sectional TEM image in FIG. 7C. The dark phase in the TEM images corresponds to PS and light phase is the PMMA. For comparison, an "as-cast" film (no annealing) resembles a homogeneous single-phase morphology as illustrated in the cross-sectional TEM image in FIG. 7A.

To underscore the importance of CZA-SS on BCP orientation and on the resulting breakdown properties, control samples were subjected to comparable thermal annealing at 205° C. (>>$T_g$) in a vacuum oven and the morphologies were compared to CZA-SS samples. At relatively short times (6 h), the oven-annealed films exhibited predominantly perpendicular (to substrate) lamellar domains with some fraction of parallel lamellae near the substrate and air interfaces; at longer annealing times (96 h), the fraction of perpendicular lamellae decreased and parallel lamellar orientation dominated. This can be ascribed to the preferential wetting of PMMA on the native oxide-covered substrate surface while the lower surface tension PS covers the film-air interface, followed by propagation of this surface interaction induced parallel lamellar ordering from both the substrate and air interface via thermal annealing. However, the strength of the surface interactions diminish with increasing distance and lead to mixed orientations away from the surfaces, especially in thick films. Hence, even after 96 h annealing, the lamellae did not orient completely parallel throughout the film, exhibiting some fraction of perpendicular lamellar component as seen in FIG. 7B.

The internal ordering and average interfacial structure within the films was further examined through neutron reflectivity (NR) studies on a deuterated BCP, dPS-b-PMMA (19.5-b-18.1 kg mol$^{-1}$). The PS block is deuterated for neutron contrast; the self-assembly behavior of this BCP is essentially identical to its non-deuterated analogue. A NR curve of a CZA-SS processed film shows five orders of well-defined Bragg reflection peaks, indicative of highly ordered parallel lamellar morphology; i.e. domains of dPS and PMMA alternating in the film normal direction.

A composition profile normal to the substrate was obtained by fitting the data to a neutron scattering length density (SLD) profile. The film consists of approximately 44 repeating units having an average width of 27 nm, which is comprised of a dPS (~13 nm, SLD $5.7\times10^{-6}$ Å$^{-2}$) and PMMA (~14 nm, SLD $0.9\times10^{-6}$ Å$^{-2}$) block.

The PMMA preferentially wets the native oxide-covered Aluminum substrate, while the lower surface tension of PS causes this material to cover the film/air interface. The best-fit profile also suggests a sharp average interfacial width of ~5 nm between the PS and PMMA blocks, which is consistent with previous measurements of oven-annealed dPS-b-PMMA thin films studied by NR.[23] Thus, NR confirms the CZA-SS driven highly ordered parallel lamellar orientation of BCP domains in the film, which resembles a multiple barrier structure consisting of 88 alternating PS and PMMA layers. To study the effect of molecular weight on the BCP ordering and subsequently on the breakdown characteristics, we used a higher molecular weight PS-b-PMMA (33-b-33 kg mol$^{-1}$) BCP. For BCPs, a direct correlation exists between the domain size $L_0$ and the molecular weight; $L_0 \alpha \chi^{1/6} N^{2/3}$, where $\chi$ is the interaction parameter between the two blocks and N is the degree of polymerization. Thus, when using the higher molecular weight PS-b-PMMA we also increase domain size from 27 nm to 37.5 nm, while keeping film thickness constant.

Grazing-Incidence Small-Angle X-ray Scattering (GISAXS) experiments were performed in order to investigate the orientation and long-range ordering within the films under different processing conditions for all BCP systems under this study. The grazing-incidence angle (0.18°) was kept above the film critical angle (0.16°) thereby ensuring the measurement probes the entire film thickness. Two-dimensional GISAXS images and their corresponding intensity profiles for the higher molecular weight PS-b-PMMA (33-b-33 kg mol$^{-1}$) system were obtained.

The as-cast film exhibited a very broad first order peak in $q_x$ and no distinct peaks in $q_z$, which is typical for poorly ordered materials lacking well-defined domains, whereas oven annealing results in the appearance of peaks along both $q_x$ and $q_z$, indicating the coexistence of perpendicular and parallel lamellar orientation. For the 6 h oven-annealed sample, up to 4 orders of in-plane Bragg peaks with $q_x$ values in the ratio 1:2:3:4 are observed, while none out-of-plane, indicative of mostly perpendicular lamellae throughout the film. At longer annealing times (96 h), there is an appearance of higher-order out-of-plane peaks along with the in-plane peaks indicating a mixed lamellar morphology. The diffuse isotropic rings connecting the in-plane and out-of-plane Bragg peaks is a signature of lamellae with mixed orientations. Thus, with increasing annealing time, parallel oriented BCP domains are favored over vertical orientation, as discussed previously. Nevertheless, there exists a point where the morphology does not evolve further with additional annealing. In contrast to oven annealing, CZA-SS processed films exhibit no peaks along $q_x$ indicating there is no perpendicular lamellae component, while higher-order peaks are observed along $q_z$ indicating a morphology with well-defined lamellar domains oriented parallel to the substrate. Similar GISAXS trends where observed for the low molecular weight PS-b-PMMA (19.5-b-18.1 kg mol$^{-1}$) films.

The processing-morphology trend for the PS-b-P2VP films is very similar to that for PS-b-PMMA as determined by cross-sectional TEM images and complementary GISAXS data. The TEM of as-cast films resembles a homogenous single-phase system, while GISAXS shows very broad spots in $q_x$ indicating domains lacking any long-range order. Short time oven annealing results in morphology with mixed lamellar orientations having a predominant perpendicular component. The CZA-SS processed films show extremely well ordered and highly oriented parallel lamellae (domain size~37 nm) that resemble a multilayered structure of alternating PS and P2VP layers. These results clearly underscore the importance of the CZA-SS process and its general applicability to continuously fabricate highly oriented, well-ordered lamellar structures in micron thick BCP films on non-modified, conductive substrates at much faster rates than conventional annealing and potentially over large areas.

Dielectric Performance of BCP Films:

BCP films with representative unordered, perpendicular and parallel lamellar ordering were subjected to dielectric breakdown experiments to characterize dielectric strength. These were obtained by testing the film as-cast, annealing the film for 6 h under vacuum, and applying the CZA-SS procedure, respectively. Films annealed for 96 h that exhibit a mixture of lamellar orientations were also examined. The dielectric failure data for PS (100 kg mol$^{-1}$), P2VP (77 kg mol$^{-1}$), PMMA (88 kg mol$^{-1}$) homopolymer control films, 33-b-33 kg mol$^{-1}$ PS-b-PMMA, 19.5-b-18.1 kg mol$^{-1}$ [1] PS-b-PMMA and 25-b-25 kg mol$^{-1}$ PS-b-P2VP films respectively.

A two-parameter Weibull cumulative probability function was employed to fit the data and is given by P (E)=1−exp$[-(E/E_{BD})^\beta]$, where P (E) is the cumulative probability for failure, E is experimental breakdown strength, $E_{BD}$ reflects the electric field where there is 63.2% probability for failure, β is the shape parameter associated with the least squares fit of the distribution. Data from these fits are summarized in Table 1. The PS and PMMA homopolymer films yielded $E_{BD}$ values of 251 V/μm and 494 V/μm, respectively. Thus, a film comprised of 1:1 PS: PMMA would be expected to have characteristic breakdown strength of ~375 V/μm by simple rule-of-mixtures. As-cast 33-b-33 kg mol$^{-1}$ PS-b-PMMA films yielded a breakdown strength value of 403 V/μm, which is comparable to this rule-of-mixture estimate. Films annealed for 6 h exhibited a significant drop off in breakdown strength (316 V/μm), while films annealed for 96 h showed an enhancement (529 V/μm) as compared to the as-cast film. CZA-SS processed films exhibited the best performance with an $E_{BD}$ value of 599 V/μm, which is a 60% improvement above the rule-of-mixtures estimation. Similar trends were observed for the lower molecular weight PS-b-PMMA (19.5-b-18.1 kg mol$^{-1}$), with $E_{BD}$ values approximately 10% lower when comparing equivalent sample morphologies. Here, the as-cast film yielded an $E_{BD}$ value of 346 V/μm, while the 6 h and 96 h films had breakdown strengths of 286 V/μm and 476 V/μm, respectively. The CZA-SS sample again exhibited the highest breakdown strength with a value of 520 V/μm. β values were observed to be unaffected by molecular weight or morphology for PS-b-PMMA films, falling in the range of 4-7 for all films under investigation. Results for breakdown tests performed on 25-b-25 kg mol$^{-1}$ PS-b-P2VP films (as-cast, annealed for 6 h, and CZA-SS processed) show breakdown strength trend that matches the one observed for the PS-b-PMMA, which proves the general dependence of the breakdown on the nanostructure of the BCP films irrespective of the disparity in dielectric properties of individual blocks; however, the difference between CZA-SS (390 V/μm) and as-cast (344 V/μm) films was smaller (~14% enhancement) as compared to the PS-b-PMMA samples. It is interesting to note that although the morphology and layer thickness for both CZA-SS processed 25-b-25 kg mol$^{-1}$ PS-b-P2VP and 33-b-33 kg mol$^{-1}$ PS-b-PMMA films is similar (~37 nm), there is disparity in the breakdown strength enhancement. This can be attributed to the breakdown strength of P2VP (382 V/μm) component, which is much lower than PMMA and thus limits the breakdown enhancement available to PS-b-P2VP as compared with PS-b-PMMA.

TABLE 1

Summary of characteristic dielectric breakdown strength ($E_{BD}$) and shape parameter β measured for PS, PMMA, PS-b-PMMA and PS-b-P2VP films.

| Sample | | $E_{BD}$ (V/μm) | β |
|---|---|---|---|
| 100 k PS | | 251 | 7.1 |
| 77 k P2VP | | 382 | 8.5 |
| 88 k PMMA | | 494 | 10.2 |
| 19.5 k-b-48.1 k PS-b-PMMA | 6 h oven | 289 | 4.1 |
| | As-cast | 346 | 5.4 |
| | 96 h oven | 467 | 6.4 |
| | CZA-SS | 520 | 4.6 |
| 33 k-b-33 k PS-b-PMMA | 6 h oven | 316 | 6.4 |
| | As-cast | 403 | 5.8 |
| | 96 h oven | 529 | 6.2 |
| | CZA-SS | 599 | 6.1 |
| 25 k-b-25 k PS-b-P2VP | 6 h oven | 322 | 4.9 |
| | As-cast | 344 | 5.4 |
| | CZA-SS | 390 | 10.4 |

Focusing on the high-breakdown strength PS-b-PMMA system, we discuss the results in more detail, outlining the likely mechanism of $E_{BD}$ enhancement. The results clearly demonstrate how BCP morphology impacts breakdown strength, as we observe significant differences in $E_{BD}$ for 6 h oven annealed PS-b-PMMA samples when compared to CZA-SS processed films. The compositions of the films are identical—only their sample morphologies are changed (perpendicular lamellae vs parallel lamellae). The dielectric strength for both molecular weight as-cast PS-b-PMMA films falls within 10% of the rule-of mixtures breakdown estimate. This supports the idea that as-cast films behave similarly to a single-phase polymer system whose dielectric behavior is an average of its constituents. Forcing lamellae to align predominantly perpendicular within the film—as in the 6 h annealed films—yielded breakdown values closer to neat PS (250 V/μm). Since failure is more likely to occur in the poorer breakdown component (PS) and the perpendicular lamellae can span much of the entire sample thickness, it is likely both breakdown initiation and propagation events take place within PS blocks only. In contrast, the films with parallel lamellae obtained via CZA-SS gave $E_{BD}$ values 50% higher than their as-cast counterparts. Interestingly, these values were even higher than the stronger component PMMA (494 V/μm) of the film, with ~5% increase for the lower molecular weight and ~21% increase for the higher molecular weight PS-b-PMMA over pure PMMA. This clearly indicates an enhancement due to morphology and is significant considering the energy density scales as the square of the $E_{BD}$. We attribute this to the introduction of multiple interfaces within the layered film, which act as barriers to the applied electric field, providing a tortuous pathway for the electrical tree propagation thereby forestalling the breakdown process.

The improvement in breakdown strength facilitated by the layered film architecture comes at no cost to the relative permittivity and loss of the films. The permittivities of BCP films essentially follow a mean-field approximation and the values lie between those of component homopolymers. Dielectric spectroscopy experiments demonstrate that all PS-b-PMMA and PS-b-P2VP samples, regardless of morphology and molecular weight, have comparable permittivity spectra. This is expected as the relative composition of the PS and PMMA/P2VP block fraction remains constant for all samples; only the morphology is variant. Therefore, we have successfully improved breakdown strength with no deleterious effect to the relative permittivity or loss (tan δ), which is of critical importance when considering the energy storage performance of the films.

The maximum theoretical energy storage densities of the BCP films with different morphologies and respective homopolymer controls are calculated based on Equation 1 using the experimentally obtained dielectric permittivity ($\varepsilon_r$) and breakdown strength ($E_{BD}$) values.

$$U = \tfrac{1}{2}\varepsilon_0 \varepsilon_r E_{BD}^2 \quad (1)$$

where $\varepsilon_0$ (8.85×10$^{-12}$ F/m) is the permittivity of free space.

Figure 8:
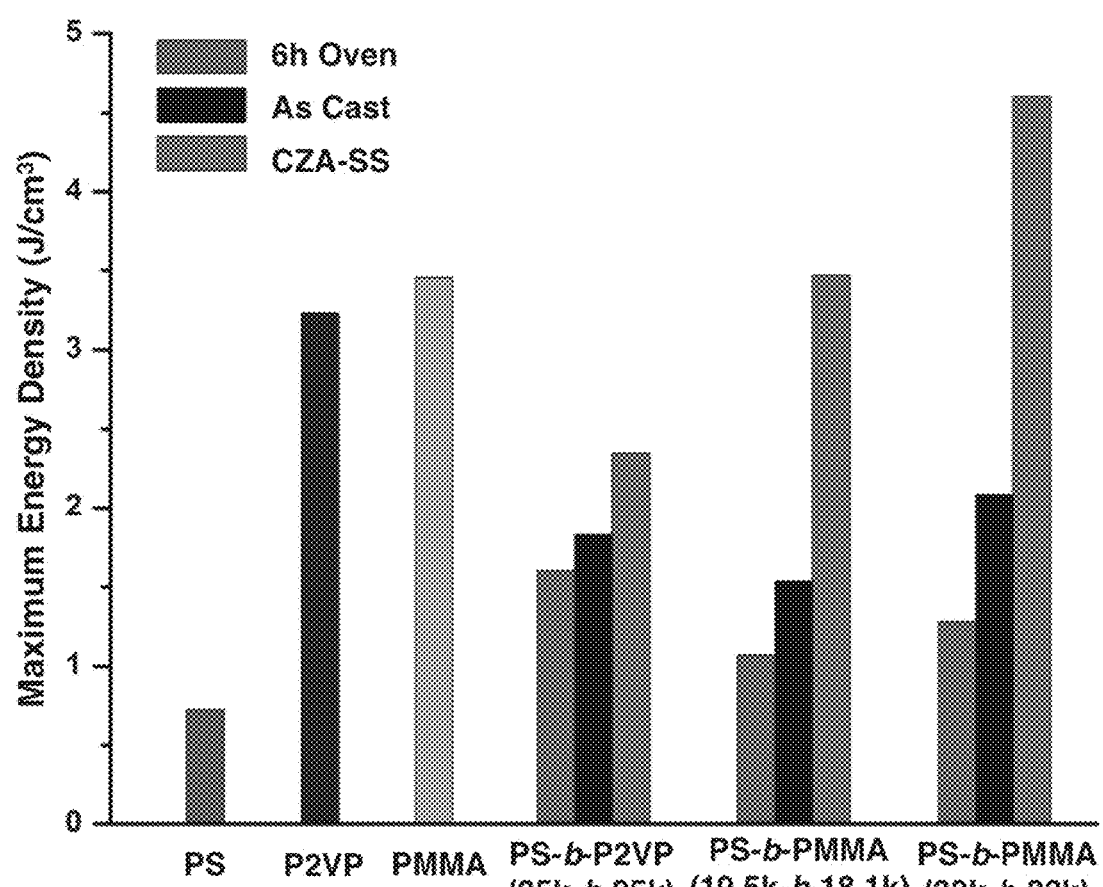
FIG. 8 provides plotted energy density trends of BCP dielectric films using the maximum theoretical energy storage performance of component homopolymer and BCP films under different processing conditions, calculated from Equation (1) using experimentally obtained values of breakdown strength ($E_{BD}$) and relative permittivity ($\varepsilon_r$).

The energy density trends are plotted in FIG. 8. The CZA-SS processed films with parallel lamellae always exhibit higher energy densities than corresponding as-cast or oven annealed films for both PS-b-PMMA and PS-b-P2VP. In fact, the PS-b-PMMA films with layered architecture exhibit more than double (~2.25 times) the energy storage density (4.6 J/cm$^3$) as compared to the as-cast films (2 J/cm$^3$) and ~3.5 times that of oven annealed films (1.3 J/cm$^3$) with predominantly perpendicular lamellae. They also exhibit higher energy storage performance than the individual PS and PMMA homopolymer components. It is noteworthy that although the BCP systems used here comprise of amorphous polymer components rather than semicrystalline polymer capacitor materials, yet the maximum energy densities obtained using the self-assembly approach are comparable or even higher (4.6 J/cm$^3$) than the industrial-standard semicrytalline BOPP films (4 J/cm$^3$). With a judicious choice of BCP comprising a high dielectric strength ($E_{BD}$) block, e.g. PMMA or semicrystalline PP, and another block with high permittivity ($\varepsilon_r$), say PVDF, the resulting energy storage density (a product of the two quantities) could be significantly enhanced through this self-assembly strategy in future applications of this technology. Thus the BCP strategy allows for the design of block specific functionality. This is not only significant from the energy storage point of view, but the weaker dielectric component may be used to incorporate other useful properties such as high mechanical strength, UV resistance, high refractive index, low oxygen permeability, properties that permit use of these films in other multifunctional technologies. For instance, in the present system, one may consider that in the case of higher molecular weight PS-b-PMMA, we enhanced the breakdown strength of the stronger component (here PMMA) by ~21% which is notable, while the PS layers can bring auxiliary function such as better UV resistance for outdoor applications.

What is claimed is:
1. A capacitor comprising:
  a first electrode;
  a second electrode, where the first electrode and the second electrode are each made of a metal selected from graphene, Ni, Al, Pt, Pd, Ta, Au, Ag, or Cu; and
  a dielectric material between the first electrode and the second electrode, where the dielectric material com- prises a self-assembled block-copolymer film with periodic morphology, the self-assembled block-copolymer film including two or more polymer blocks with different breakdown strengths.

2. The capacitor of claim 1, where the periodic morphology of the self-assembled block-copolymer film is lamellar, cylindrical, spherical, bicontinuous double gyroid, bicontinuous cubic or hexagonally perforated lamellar.

3. The capacitor of claim 1, where the self-assembled block-copolymer film has a lamellar morphology that is horizontally oriented into layers of copolymer parallel to the first electrode and second electrode.

4. The capacitor of claim 3, where the layers of the self-assembled block-copolymer film are from about 5 nm to about 150 nm thick.

5. The capacitor of claim 3, where the self-assembled block-copolymer film includes an additional polymer miscible with one of the polymer blocks, where the additional polymer is immiscible with another of the polymer blocks.

6. The capacitor of claim 5, where the additional polymer is a homopolymer.

7. The capacitor of claim 3, where one of the polymer blocks of the block-copolymer of the self-assembled block-copolymer film has a different relative permittivity.

8. The capacitor of claim 3, where the self-assembled block-copolymer film Includes a filler, wherein the filler has a high permittivity to thereby further improve the dielectric performance of the self-assembled block-copolymer film.

9. The capacitor of claim 8, where the filler is an inorganic filler.

10. The capacitor of claim 8, where the filler is an organic filler.

11. The capacitor of claim 3, where at least one of the polymer blocks of the block copolymer of the self-assembled block-copolymer film is an amorphous polymer.

12. The capacitor of claim 3, where at least one of the polymer blocks of the block copolymer of the self-assembled block-copolymer film is a semi-crystalline polymer.

13. The capacitor of claim 3, where at least one of the polymer blocks of the block copolymer of the self-assembled block-copolymer film is an elastomer.

14. The capacitor of claim 3, where at least one of the polymer blocks of the block copolymer of the self-assembled block-copolymer film is an inorganic polymer.

15. A capacitor comprising:
a first electrode;
a second electrode; and
a dielectric material between the first electrode and the second electrode,
wherein the dielectric material comprises a self-assembled block-copolymer film with a periodic morphology, where the self-assembled block-copolymer film has a lamellar morphology that is horizontally oriented into layers of copolymer parallel to the first electrode and the second electrode, where the self-assembled block-copolymer film has at least 8 layers of copolymer.

16. A capacitor comprising:
a first electrode;
a second electrode; and
a dielectric material between the first electrode and the second electrode,
wherein the dielectric material comprises a self-assembled block-copolymer film with a periodic morphology, where the self-assembled block-copolymer film has a lamellar morphology that is horizontally oriented into layers of copolymer parallel to the first electrode and the second electrode, where the self-assembled block-copolymer film includes a filler, where the filler is dispersed in non-contiguous layers of the layers of copolymer.

17. A capacitor comprising:
a first electrode;
a second electrode; and
a dielectric material between the first electrode and the second electrode,
wherein the dielectric material comprises a self-assembled block-copolymer film with a periodic morphology, where the self-assembled block-copolymer film has a lamellar morphology that is horizontally oriented into layers of copolymer parallel to the first electrode and the second electrode, where the self-assembled block-copolymer film has a higher breakdown strength than that of the same block copolymer that does not have periodic morphology.

18. A circuit comprising the capacitor of claim 17.

19. A method for preparing the capacitor of claim 17 comprising:
ordering a block-copolymer film in a cold zone annealing soft shear apparatus to produce the self-assembled block-copolymer film; and
adding an electrode so that the electrode is parallel to the layers of copolymer.

20. The method of claim 19, where the step of ordering a block-copolymer film in a cold zone annealing soft shear apparatus comprises
contacting the block-copolymer film with a confining layer, wherein one of the block-copolymer film and the confining layer has a coefficient of thermal expansion that is at least twice the coefficient of thermal expansion of the other, moving the block-copolymer film and the annealing zone relative to each other, such that the block-copolymer film is positioned in between the heating element and the confining layer; and
moving the block-copolymer film and the annealing zone relative to each other to anneal the block-copolymer film with the annealing zone.

21. The method of claim 20, where the block-copolymer film is supported by an electrode.

22. The method of claim 19, where the step g adding an electrode so that the electrode is parallel to the layers of copolymer is performed by sputter coating an electrode onto the block-copolymer film.

* * * * *